United States Patent Office 2,991,957
Patented July 11, 1961

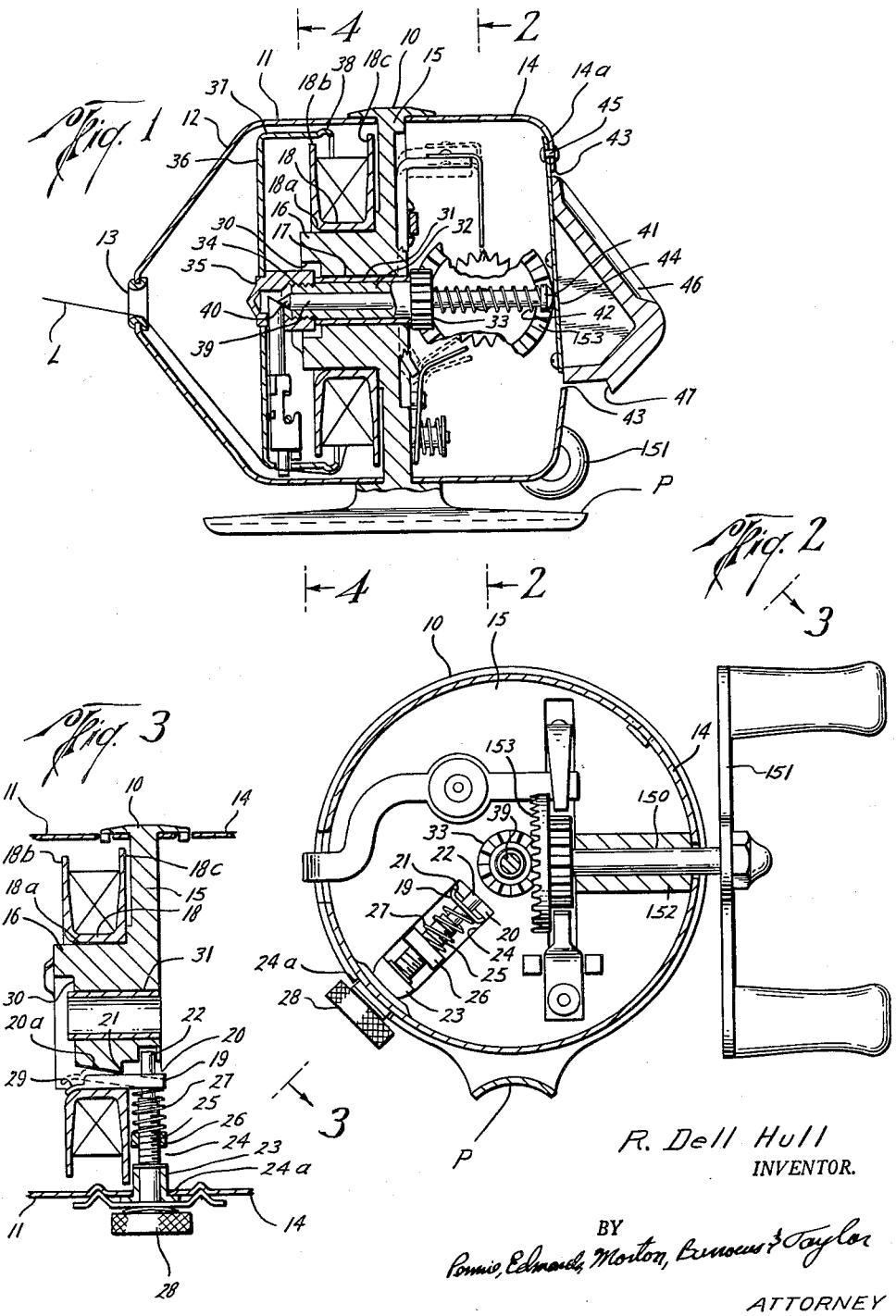

2,991,957
DRAG BRAKE FOR CLOSED-FACE
SPINNING REEL
R. Dell Hull, 1131 E. Easton St., Tulsa, Okla.
Original application Aug. 27, 1957, Ser. No. 680,501. Divided and this application Jan. 26, 1959, Ser. No. 788,813
7 Claims. (Cl. 242—84.5)

This application is a divisional of my co-pending application Serial No. 680,501, filed August 27, 1957, for "Closed-Face Spinning Reel."

This invention relates to fishing reels and more particularly to improvements in spinning reels.

The present invention is directed to improvements in spinning reels of the so-called "closed-face" type. In this type of spinning reel, the line spool is enclosed within a casing normally provided with a front portion or cover, which may be of conical or concavo-convex form, having a central opening or eye through which the line travels as it moves over the front face or flange of the line spool in passage to and from the spool, the line opening being ordinarily co-axial with the axis of the spool. Reels of this general type are illustrated in my U.S. Patents Nos. 2,668,025 and 2,675,192.

A primary object of the present invention is to provide a spinning reel of the general type described in which the various operating and line control elements are of improved and generally simplified design, whereby to improve the efficiency and ease of operation, and to reduce cost of construction of the reel. Specifically, this invention relates to an improved and simplified form of drag brake for controlling rotation of the line spool when under pull by a fish, in order to prevent breakage of the line, the drag brake also serving an additional function of retaining the line spool properly positioned in the reel assembly.

Other and more specific objects and advantages of this invention will become more readily apparent from the following detailed description when read in conjunction with the accompanying drawings which illustrate a useful embodiment of the improved reel structure in accordance with the present invention.

In the drawing:

FIG. 1 is a longitudinal sectional view of the reel showing the parts in the positions occupied during rewinding;

FIG. 2 is a transverse cross-sectional view taken generally along line 2—2 of FIG. 1; and FIG. 3 is a cross-sectional view taken generally along the line 3—3 of FIG. 2 showing the drag brake elements, some of the other parts of the reel being removed for purposes of clarity.

Referring to the drawings:

The reel comprises a generally tubular casing or frame 10 constructed of any suitable material, such as metal, plastic, or the like, and is provided with a front cover 11 insertible in the forward end portion of casing 10 and removably secured thereto in a manner to be hereinafter described. Casing 10 is provided with the usual support plate P for attaching the reel to the reel seat of a fishing rod in the usual manner. The forward portion of cover 11 is formed with a forwardly tapered conical portion 12 provided at its apex with a line guide opening 13 through which line L may pass to and from the interior of the cover. A rear cover 14 fits into the rear end portion of casing 10 and is removably secured thereto in a manner to be described subsequently. A wall 15 extends across and forms part of the frame or casing 10 and has formed in the center thereof a forwardly projecting cylindrical boss 16 having an axial bore 17. A line spool 18 having an axial bore 18a and forward and rear flanges 18b and 18c, respectively, is mounted on boss 16 in front of wall 15 and is arranged for controlled rotation about boss 16, as will be more fully described hereinafter.

Rotation of spool 18 about boss 16 is controlled by a slipping clutch or drag mechanism, as best seen particularly in FIGS. 1, 2 and 3. This drag mechanism comprises a brake shoe 19 which lies in a slot 20 (FIG. 3) provided in the periphery of boss 16 extending generally parallel to the axis of the boss and opening through the rearward face of wall 15. At an intermediate point in slot 20 the bottom of the slot is sloped at 20a toward the axis of the boss to thereby form the fulcrum or pivot 21 on which shoe 19 is rockable by means of a brake rod 22 which passes through the rearward end of the shoe. Rod 22 is disposed in a radial groove 24 which extends from the exterior of the casing into communication with slot 20. Rod 22 passes through a bushing 23 mounted in a radial opening 24a in the casing. An intermediate section 25 of rod 22 is externally threaded to receive a square nut 26 which is non-rotatably slidable in radial groove 24. A coil spring 27 is positioned about rod 22 in compression between nut 26 and shoe 19 whereby it will be seen that as rod 22 is rotated in one direction by means of the knurled head 28 mounted thereon externally of the casing, nut 26 will be advanced along threaded section 25 and will compress spring 27, thereby urging the outer end of shoe 19 about fulcrum 21 toward the bore wall of spool 18. The outer end of shoe 19 carries an outwardly curved toe 29 which is thus urged toward a similarly curved portion of the wall of bore 18a of spool 18 and the leverage thus applied to toe 29 intensifies the frictional engagement between the toe and the spool, thereby increasing the drag on the spool. Rotation of rod 22 in the reverse direction will release the spring pressure on the outer end of shoe 19, thereby allowing toe 29 to be slightly retracted from, or relieve its pressure on, the spool and thus reduce the drag or resistance to rotation of the spool. The retracted position of shoe 19 and toe 29 is indicated by the broken lines in FIG. 3.

In accordance with one aspect of the invention, the brake shoe 19, in addition to controlling rotation of the spool 18, functions in a further capacity, in that it serves to hold the spool against axial displacement on the boss 16. In this respect, the inner end of the shoe is locked against axial movement by the brake rod 22, and the shoe projects forwardly, through the central eye of the spool. The forward or toe portion 29 of the shoe extends radially outward somewhat, engaging a limited portion of the front face of the spool, so that when the shoe is in its normal position as shown in FIG. 3, the spool 18 is releasably held against axial movement on the boss 16. Removal and replacement of the spool 18 may be readily accomplished by forcing the forward end of the shoe 19 radially inward, against the action of the spring 27, and advantageously, the toe 29 is curved only slightly in an outward direction, so that the spool may be withdrawn by the application of axial force thereto sufficient to press the shoe 19 inwardly.

The forward end of bore 17 is counterbored for a short distance to provide the annular recess 30, and an anti-friction bearing 31 is disposed in bore 17 and projects slightly forwardly into recess 30, as best seen particularly in FIG. 1. A tubular shaft 32 is slidably inserted in the bore of bearing 31 and is rotatable therein and carries on its rearward end a pinion 33 which is fixedly secured on the shaft and bears against the rearward end of bearing 31, which forms a stop therefor. The forward end of shaft 32 extends in front of the end of boss 16 and is reduced in diameter and is externally threaded at 34 to threadedly receive the hollow hub 35 of a circular pickup head 36 which is secured to hub 35 and has about its outer periphery an annular flange 37 which projects rearwardly over the outer periphery of spool flange 18b to a point intermediate the spool flanges. The inner end of hub 35 when screwed on threads 34 of the shaft will extend into recess 30 and abut the forward end of bearing 31 and thereby draw pinion 33 against the rearward end of bearing 32 and hold these parts together. The rearward end of flange 37 is rounded at 38 to permit smooth passage of line L thereover in its movement to and from spool 18.

A crank shaft 150 (FIG. 2) is mounted in casing 10 at right angles to its longitduinal axis and projects radially through the wall of the casing and has mounted on its outer end a winding handle 151. The inner end of crank shaft 150 is journaled in a support bearing 152 which is supported on the rear face of wall 15. Crank shaft 150 carries on its inner end a gear 153 which is in mesh with pinion 33, whereby rotation of crank shaft 150 will rotate shaft 32 and pick-up head 36.

A cylindrical control rod 39 extends slidably through the bore of shaft 32 and through pinion 33 and projects rearwardly from the latter. The forward end of rod 39 extends into the bore of hub 35, as best seen in FIG. 1, and has its forward end shaped to provide the forwardly tapering conical tip 40. The rearwardly projection portion of control rod 39 extends to a point adjacent the rear wall 14a of rear cover 14 and has mounted on its rearward end a rounded head 41. A coil spring 42 is mounted about the rear portion of rod 39 and is disposed in compression between head 41 and pinion 33, thereby normally urging the control rod rearwardly in shaft 32. The rear wall 14a of cover 14 is provided with an opening 43 and a leaf spring 44 having its upper end secured to the upper edge of opening 43 at 45 depends into opening 43. The free portion of the leaf spring is adapted to be resiliently pressed against head 41 on the control rod by pressure applied through a thumb pressure plate 46 which is secured to the rear face of leaf spring 44 and is projectable therewith through opening 43. Thumb pressure plate 46 is provided with a shoulder 47 which is adapted to engage the lower edge of opening 43 to limit the inward movement of leaf spring 44. It wil be understood that when pressure is applied to thumb plate 46 leaf spring 44 will push against head 41 to overcome the resistance of coil spring 42 and thus urge control rod 39 forwardly against the resistance of coil spring 42. When pressure is relieved from thumb pressure plate 46, the normal resilience of leaf spring 44 will cause the leaf spring to retract and permit coil spring 42 to urge control rod 39 to its rearward position, as best seen in FIG. 1.

Other features of the new reel form the subject matter of my copending applications Serial No. 680,501, filed August 27, 1957, Serial No. 788,889, filed January 26, 1959, Serial No. 789,039, filed January 26, 1959 and Serial No. 788,814, filed January 26, 1959. Reference should be made to these copending applications for further details of the construction and operation of the new reel.

The new drag brake construction described herein is particularly advantageous in that it permits the construction of the reel to be substantially simplified. Thus, the braking effect is achieved by means of a brake shoe which projects longitudinally through the eye of the line spool and is pivoted to bear radially outward against the spool. The forward portion of the brake shoe engages the spool in such manner as to prevent axial movement of the spool relative to the stationary hub on which the spool is supported.

The reel constructed as heretofore described is relatively light in weight, comprises parts which may be easily and quickly assembled and is, therefore, quite low in cost of manufacture, and which, by reason of its novel features of construction and combination thereof as described, is exceptionally easy to use and very efficient and substantially fool-proof in operation.

It will be understood that various changes and modifications may be made in the details of the illustrative embodiment within the scope of the appended claims but without departing from the spirit of this invention.

I claim:

1. In a spinning reel of the type having a reel frame, a hub on said frame, a normally non-rotatable annular line spool having a central eye received over said hub, and drag brake means acting on said line spool, the improvement characterized by said hub constituting the principal support for said spool and having an axial recess therein, said drag brake means comprising an axially disposed brake shoe received in said recess radially inward of the eye of the line spool and having a portion projecting rearwardly of the spool, means constituting a fulcrum for said shoe, and adjustable spring means for rocking the projecting end of the shoe to urge the forward end of the shoe into frictional contact with said line spool.

2. The reel of claim 1, in which the line spool is axially slidable on said hub, and brake shoe has means engaging said line spool and normally preventing axial movement thereof.

3. In a spinning reel of the type having a reel frame, a hub on said frame, a normally non-rotatable annular line spool having a central eye received over said hub, and drag brake means acting on said line spool, the improvement characterized by said line spool being received axially on and supported principally by said hub, said hub having a recess therein, a brake shoe received in said recess between said spool and hub and having a forward portion extending generally axially along the eye of said spool, means on said hub supporting said brake shoe for pivotal movement, an end portion of said shoe projecting axially rearward beyond the spool, means mounted on said frame and operable adjustably to urge said end portion generally radially inward and thereby to urge the forward portion of said shoe radially outward against the spool, means interconnecting said shoe and frame to limit relative axial movement thereof, and interengaging means on said shoe and spool normally preventing relative axial movement therebetween.

4. The reel of claim 3, in which the brake shoe has a toe portion at its forward end projecting radially outward and overlying a portion of the front face of the spool for normally preventing forward axial movement of the spool on the hub, said toe portion and said front face portion forming said interengaging means.

5. The reel of claim 4, in which the adjustably operable means comprises spring means acting on said shoe in a manner tending to urge said end portion radially inward.

6. The reel of claim 3, in which the supporting means comprises means on the hub and forming part of the walls of said recess constituting a fulcrum, said shoe being supported between its forward portion and its extending end by said fulcrum, and the adjustably operable means includes spring means acting radially inward upon the extending end of the shoe whereby to urge the forward portion of the shoe radially outward.

7. The reel of claim 6, in which the adjustably operable means includes a manually engageable member for adjusting the acting force of the spring means.

References Cited in the file of this patent

UNITED STATES PATENTS

| 2,574,718 | Swigerd | Nov. 13, 1951 |
| 2,705,113 | Bonanno | Mar. 29, 1955 |
| 2,719,680 | Denison et al. | Oct. 4, 1955 |
| 2,828,927 | Yeada | Apr. 1, 1958 |